(12) United States Patent
Heimann et al.

(10) Patent No.: US 12,270,541 B2
(45) Date of Patent: Apr. 8, 2025

(54) COMBUSTION SYSTEM FOR A BOILER WITH FUEL STREAM DISTRIBUTION MEANS IN A BURNER AND METHOD OF COMBUSTION

(71) Applicant: General Electric Company, Schenectady, NY (US)

(72) Inventors: Jakob Heimann, Baden-Wurttemberg (DE); Dragisa Ristic, Baden-Wurttemberg (DE); Andrej Owertschuk, Stuttgart (DE); Wadim Pimenov, Ostfildern (DE)

(73) Assignee: GE INFRASTRUCTURE TECHNOLOGY LLC, Greenville, SC (US)

(*) Notice: Subject to any disclaimer, the term of this patent is extended or adjusted under 35 U.S.C. 154(b) by 449 days.

(21) Appl. No.: 17/995,962

(22) PCT Filed: Apr. 13, 2021

(86) PCT No.: PCT/IB2021/053056
§ 371 (c)(1),
(2) Date: Oct. 11, 2022

(87) PCT Pub. No.: WO2021/209906
PCT Pub. Date: Oct. 21, 2021

(65) Prior Publication Data
US 2023/0213185 A1    Jul. 6, 2023

(30) Foreign Application Priority Data
Apr. 16, 2020    (EP) .................................... 20169874

(51) Int. Cl.
*F23D 14/70*    (2006.01)
*F23D 14/64*    (2006.01)

(52) U.S. Cl.
CPC ............. *F23D 14/70* (2013.01); *F23D 14/64* (2013.01); *F23D 2900/14021* (2013.01)

(58) Field of Classification Search
CPC .......... F23D 14/64; F23D 17/005; F23D 1/02; F23D 14/70; F23D 14/62
See application file for complete search history.

(56) References Cited

U.S. PATENT DOCUMENTS

| 4,669,398 A | 6/1987 | Takahashi et al. |
| 4,674,417 A | 6/1987 | Hoskinson |

(Continued)

FOREIGN PATENT DOCUMENTS

| EP | 3026338 A1 | 6/2016 |
| WO | 03/083370 A1 | 10/2003 |
| WO | 2010/082237 A1 | 7/2010 |

*Primary Examiner* — Alfred Basichas
(74) *Attorney, Agent, or Firm* — Grogan, Tuccillo & Vanderleeden LLP (57) ABSTRACT

A combustion system comprising a burner for supplying a mixed flow of fuel and primary air or gas through at least one fuel nozzle to a combustion chamber, a duct in fluid communication with the at least one fuel nozzle for guiding the mixed flow to the at least one fuel nozzle, and a deflector device positioned within the duct upstream of the at least one fuel nozzle to deflect the incoming mixed flow. The deflector device comprises ejection means arranged to eject an auxiliary gas into the duct to deflect the incoming mixed flow in a direction from a center to outer areas of the duct to increase the concentration of the mixed flow in outer areas of the fuel nozzle and decrease the concentration of the mixed flow in the center section of the fuel nozzle.

17 Claims, 7 Drawing Sheets

(56) References Cited

U.S. PATENT DOCUMENTS

| | | | |
|---|---|---|---|
| 4,940,006 A | 7/1990 | Temelli | |
| 5,826,428 A | 10/1998 | Blaschke | |
| 6,120,281 A | 9/2000 | Vatsky | |
| 8,857,733 B1 | 10/2014 | Galbraith et al. | |
| 2016/0153657 A1* | 6/2016 | Hilber | F23D 23/00 |
| | | | 431/174 |
| 2016/0169505 A1 | 6/2016 | Ilchenko et al. | |

* cited by examiner

COMBUSTION SYSTEM FOR A BOILER WITH FUEL STREAM DISTRIBUTION MEANS IN A BURNER AND METHOD OF COMBUSTION

The present invention relates to a combustion system and more particularly a combustion system for a boiler for power generation having fuel stream distribution means in a burner and a method of combustion using such a combustion system.

Boilers often have combustion systems with furnaces that may be fired with solid fuel, such as bituminous coal, lignite, biomass, etc. Such combustion systems are usually provided with mills arranged to pulverize the solid fuel, e.g. coal, and ducting for supplying the pulverized fuel to one or more burners. The pulverized coal and air (gas) is supplied into a combustion chamber of the boiler and ignited to create hot flue gases which can be used to create steam for power generation or other, e.g. industrial, applications.

Instead of pulverized fuels, other fuel types, such as gaseous fuels, e.g. natural gas, may also be used for combustion in a boiler. It is desired to also use fuel gas mixtures obtained from refinery gases, for example. Refinery gases are gaseous by-products in petroleum refineries, which are produced during the processing of crude oil. Refinery gases may have a low calorific value and may be mixed with natural gas and/or gaseous liquefied petroleum gas (LPG) and fed to a furnace.

Generally, during the combustion process of fossil fuels pollutants, including nitrogen oxides (NOx), particulate matter (PM), and carbon monoxide (CO), are generated. If exhausted into the atmosphere, these pollutants can pose health hazards to humans and animals and detrimentally impact the environment and increase global warming. Emission standards throughout the world, including US and EU, regulate acceptable emission limits for NOx, CO and other pollutants. But there is a need to further reduce the actual emission levels.

NOx emissions may be reduced by lowering the flame temperature, but reducing the flame temperature may decrease the radiant heat transfer from the flame and thus lower the boiler efficiency. Some NOx control technologies used on boilers reduce NOx levels by lowering flame temperatures by modifying air/fuel mixing patterns. The lower flame temperatures and decreased mixing intensities can result in higher CO levels. High flame temperatures, intimate air/fuel mixing and a nearly complete burnout of the fuel are essential for low CO emissions. High levels of CO emissions primarily result from incomplete combustion due to poor burner design or firing conditions, e.g. an improper air-to-fuel ratio.

Other issues may arise due to the operating conditions. For example, in a pulverized coal-fired burner the pulverizing mill typically operates with a fairly constant air/gas volume flow over the whole load range. At low load, the air-fuel ratio consequently decreases, and the pulverized coal air/gas mixture becomes lean and difficult to ignite. In addition, it may be difficult to adequately stabilize the flame, causing the flame to blow out or blow back. This may be aggravated by a poor quality and/or distribution pattern of the fuel supplied to the combustion chamber of the boiler.

It is desired to flexibly use combustion systems for boilers with different types and qualities of fuels, including pulverized fuels, such as coal, petroleum coke, bituminous coal, lignite, biomass, etc., and a broad range of mixed gas fuels, such as refinery and other waste gases, while assuring safe ignition and combustion of the fuel, adequate stabilization of the flame and highly efficient performance with reduced NOx and CO emissions over the entire operating range, for full and part-load operations.

Pulverized Fuel (PF) burners, e.g. Pulverized Coal (PC) burners, are often designed and operate with deflectors, impellers, kickers or other structural features protruding into the duct of the burner to change the distribution of the pulverized fuel across the cross-section of the burner nozzle outlet. By distributing the pulverized fuel across the nozzle outlet in a desired manner it is possible to provide distinct fuel concentrations and air-to-fuel ratios in various areas of the nozzle outlet, thereby influencing the combustion process, including flame stabilization, burnout of the fuel and emission levels.

U.S. Pat. No. 4,669,398 A discloses a pulverized fuel firing apparatus comprising a first pulverized fuel injection compartment constructed such that the combined amount of primary air and secondary air to be consumed is less than the theoretical amount of air required for the combustion of the pulverized fuel, a second pulverized fuel injection compartment constructed such that the combined primary and secondary air amount is substantially equal to the theoretical air for the pulverized fuel, and a supplementary air compartment for injecting supplementary air into the furnace. The three compartments are arranged close to one another and control the NOx production upon combustion of the pulverized fuel.

EP 3 026 338 A1 discloses a combustion system for a boiler and a method of combustion of solid fuels. The combustion system comprises burners which supply a mixed flow of fuel and primary air through a fuel nozzle to the combustion chamber of the boiler. The mixed flow of fuel and primary air is supplied to the burner through a duct from a pulverizer which grinds the fuel to the required finesse. A fuel concentrator comprising a deflector and a diverger is arranged in the duct to concentrate the mixed flow of fuel and primary air in the center of the fuel nozzle. It is described that the fuel-rich concentrated jet in the center of the nozzle outlet leads to improved gasification of the mixed flow of fuel and primary air, improving the NOx emission performance of the burner and improving ignition and flame stability.

U.S. Pat. No. 6,120,281 A suggests a combustion method utilizing tangential firing, in which a coal and primary air mixture is discharged from burners located in the corners of the furnace towards an imaginary circle disposed in the center of the furnace. Air is discharged from air nozzles, which are also located in the corners of the furnace, in two flow streams, wherein one is directed towards the center of the furnace in a combustion-supporting relation to the fuel, while the other is directed along the inner surfaces of the furnace boundary walls, to maintain an oxidizing atmosphere and minimize corrosion and slagging.

It is an object of present invention to remove or at least reduce the deficiencies of the prior art combustion systems and methods designed for boilers as mentioned above. In particular, it as an object of present invention to provide a combustion system and a method of combustion, suitable for use with boilers, which can be flexibly used with different types and qualities of fuel, while providing safe ignition and combustion of the fuel, adequate stabilization of the flame and highly efficient performance with reduced NOx and CO emissions over a broad operating range. This is preferably achieved using a simple and low-wear design of the combustion system.

According to a first aspect, the present invention provides a combustion system, in particular for a boiler, comprising at least one burner for supplying a mixed flow of fuel and gas through at least one fuel nozzle to a combustion chamber, a duct in fluid communication with the at least one fuel nozzle for guiding the mixed flow of fuel and gas to the at least one fuel nozzle, and a deflector device positioned within the duct upstream of the at least one fuel nozzle to deflect the incoming mixed flow of fuel and gas. The deflector device comprises ejection means arranged to eject an auxiliary gas into the duct to deflect the incoming mixed flow of fuel and gas in a direction from a center to outer areas of the duct.

The present invention uses a kind of a "fluid deflector" to deflect the incoming mixed flow of fuel and gas from the middle of the duct to its outer areas, near the duct wall or walls using a fluid in the form of the auxiliary gas ejected from the ejection means, instead of the solid deflectors, impellers or kickers used in conventional systems. The ejected auxiliary gas impinges on the incoming mixed flow of fuel and gas and spreads it around to create distinct fuel-rich zones and fuel-lean zones at the burner or fuel nozzle outlet, which provides a typical set-up for low-NOx burners.

According to the invention, and in contrast to various means used in conventional designs, which concentrate the fuel-rich jet in the center of the fuel nozzle outlet, the ejection means are positioned relative to the fuel nozzle and configured to deflect the incoming mixed flow of fuel and gas to increase the concentration of the mixed flow of fuel and gas in outer areas of the fuel nozzle and decrease the concentration of the mixed flow of fuel and gas in the middle or center section of the fuel nozzle. This results in an improved homogenized flow of the fuel, which enters the combustion chamber and is fired therein.

It should be noted that the gas referred to herein may be any air, gas (hot or cold gas) or air and gas mixture which may be used for mixing with the fuel and combustion of the fuel and air mixture within the combustion chamber. The gas may also be interchangingly referred to herein as primary air or primary air and gas. The gas may also include an amount of recirculated flue gases resulting from the combustion in the combustion chamber. Similarly, the auxiliary gas referred to herein may be any air, gas or air and gas mixture which is suitable to perform its function as described herein. The auxiliary gas may be tapped from the primary air or gas or from the secondary air supply of the burner and may at least in part be the recirculation gas resulting from the combustion and recirculated to the ejection means. It may also be fresh air taken from the outside and pushed to the ejection means using a fan or air blower, for example, in particular in cases when the boiler has not enough primary and/or secondary air to provide the auxiliary gas or when the coal or gas fuel has a low calorific value or low milling grade and additional air is advantageous. The terms "air" and "gas" are used herein only for differentiating the gaseous fluid streams to facilitate description and understanding.

The combustion system of present invention may use any fuel desired. In preferred applications, it may use a pulverized fuel (PF), such as pulverized coal, petroleum coke, bituminous coal, lignite, biomass, etc. The fuel may also be a fuel gas mixture obtained from refinery gases or other waste gases, for example.

In a PF-fired burner, the pulverized fuel may be provided by a pulverizer or mill connected to the duct. The pulverizing mill may operate with a fairly constant air/gas volume flow over the whole load range. The deflector device of present invention then provides an increased PF fuel concentration in the outer areas of the burner outlet, thus supporting flame stabilization and ignition, especially at burner low load operation regime.

In preferred embodiments of present invention, the ejection means may comprise an auxiliary gas nozzle configured to receive the auxiliary gas and inject the auxiliary gas in a direction against or at least at an oblique angle against the flow direction of the mixed flow of fuel and gas. I.e., the ejected auxiliary gas has at least a counter flow direction component opposite to the flow direction of the mixed flow of fuel and gas. The fuel and gas mixture may thus be efficiently deflected and distributed to the sides of the duct as desired. The auxiliary gas nozzle may also be obliquely oriented to induce a swirl motion into the incoming flow of fuel.

In especially preferred embodiments, the auxiliary gas nozzle may be a counter-flow nozzle which has a nozzle outlet directed opposite to the flow direction of the mixed flow of fuel and gas such that the jet of the ejected auxiliary gas strikes the incoming mixed flow of fuel and gas in the opposite direction. A uniform deflection and distributions of the fuel and gas mixture in all outer sections of the fuel nozzle outlet may be achieved.

It may be advantageous to install the auxiliary gas nozzle, in particular the counter-flow nozzle, in a horizontal duct portion of the duct, which is directly connected to the fuel nozzle, in particular a duct portion which runs straight downstream of a last duct elbow present without any duct curvatures therein. In addition, the auxiliary gas nozzle may be positioned on the horizontal centerline of the duct portion, i.e. on the burner center axis. This allows high control of the resulting fuel distribution pattern at the nozzle outlet.

With any configuration of the auxiliary gas nozzle, in particular the counter-flow nozzle, the injection of the auxiliary gas through the nozzle at least in part in opposite direction to the main fuel flow enables to enrich the outer layer of the fuel flow, i.e. increase the fuel concentration in the outer sections of the burner outlet, decrease the fuel concentration in the middle sections of the burner outlet, and homogenize the fuel flow over the cross-section. All this provides a burner with an improved ignition performance, a large effective ignition area, also in low load operation range, and with low NOx and CO emissions. Low NOx emission levels are achieved a the reducing atmosphere in the inner flame resulting in an effective NOx reduction by reducing substances, like volatile matter and char, and diminished high oxygen level area in the outer flame of the ignition area due to the increased fuel concentration in this area. The auxiliary gas nozzle requires little maintenance, since it does not include any wear parts, like solid deflectors, impellers and the like, which are subjected to the mixed flow of fuel and gas. Erosion and wear of the burner hardware may be greatly minimized.

In case of lignite burners which use core air it is possible to redirect and use a part of the core air and to inject this part of the core air in counter flow into the duct. Only minor changes to existing lignite low-NOx burners are required.

The combustion system of any embodiment mentioned above may further comprise means arranged to vary the outlet velocity of the auxiliary gas ejected from the ejection means, in particular the auxiliary gas nozzle outlet. For example, a control device of the combustion system may adjust a flow regulating valve in the feed line connected to the auxiliary gas nozzle. In addition or as an alternative, the ejection means, in particular the auxiliary gas nozzle, may include throttle means configured to change a flow cross-section of the auxiliary gas nozzle to adjust the velocity of the ejected auxiliary gas. In other words, the ejection means or injection nozzle may have a variable aperture so as to be able to change the size of the cross-section and thus to influence the velocity of the injected auxiliary gas. In some embodiments, an additional gas blower or fan, which is adjustable or controllable in speed, may be provided to vary the outlet velocity of the auxiliary gas.

Advantageously, varying the velocity of the injected auxiliary gas may achieve the same effect as varying the location and size of the fluid deflector or a solid deflector, impeller or kicker in conventional systems. The velocity of the counter-flow injected auxiliary gas determines the size and position of the obstacle for the incoming mixed flow of fuel and gas. This facilitates easy control of how effectively the coal particles or mixed gas fuel streams are deflected from the center of the fuel-gas stream to the outside. The combustion system may thus be easily adapted to account for different types and qualities of fuel, including different degrees of grinding and/or drying of pulverized fuels, wherein the flexibility with regard to the auxiliary gas flow adjustment also allows to easily react to different burner operating conditions.

In further configurations of any embodiment of the combustion system mentioned above, the ejection means, in particular the auxiliary gas nozzle, may be arranged adjustable with regard to its orientation in space such that the ejection or discharge angle may be changed or adjusted, as needed, relative to at least two of three orthogonal axes X, Y, and Z. In such configurations, both the velocity and the swirl number of the ejected auxiliary gas can be adjusted even during a burner operation (online), as required, depending on the fuel type and the operating mode, e.g. a part load operation. An additional gas blower or fan may be used, if required.

Any embodiment including an auxiliary gas nozzle, in particular a counter-flow nozzle, mentioned above may further comprise a shield device disposed in the duct upstream of and in close proximity to a feed line suppling the auxiliary gas to the auxiliary gas nozzle for shielding the feed line from the incoming mixed flow of fuel and gas against erosion and wear. The shield device may be in the form of a semi-cylindrical shell or plate, for example, and made of a wear-resistant material.

In some advantageous embodiments, the combustion system may further comprise baffle means arranged in front, i.e. upstream of the auxiliary gas nozzle outlet and having a concave surface facing in the direction of the auxiliary gas nozzle outlet for spreading the ejected auxiliary gas to the sides of the duct. The baffle means may preferably be dish shaped or bowl shaped to evenly distribute the ejected auxiliary gas outwards, towards the duct walls bounding the duct. The deflection effect of a counter-flow nozzle may be enhanced.

The combustion system described so far may have a burner and a duct of any shape or size. For example, the duct may have a circular or rectangular cross-section. In some specific types of combustion systems, the burner may be a round burner comprising a tubular primary duct for supplying a mixed flow of fuel and gas to the combustion chamber, with the downstream end of the primary duct defining the fuel nozzle, and at least a tubular secondary duct arranged concentrically to and around the primary duct for supplying secondary air (or gas) to a combustion zone of the combustion chamber. The burner may optionally further have a tubular tertiary duct arranged concentrically to and around the secondary duct for supplying tertiary air (or gas) to the combustion zone of the combustion chamber. The deflector device may comprise a swirl tube arranged to provide the auxiliary gas to and eject the auxiliary gas into the duct in a direction so as to deflect the incoming mixed flow of fuel and gas towards the outer areas of the primary duct and to induce a swirling movement of the mixed flow of fuel and gas around a longitudinal axis of the primary duct.

The swirl tube allows to deflect the incoming mixed flow of fuel and gas from the middle of the duct outwards in the duct and to simultaneously swirl the mixed flow of fuel and gas to improve mixing and to create a preferred fuel distribution with fuel-rich zones in the outer areas of the fuel nozzle outlet and fuel-lean zones in the center of the fuel nozzle outlet to achieve a large fire ball in the combustion zone with a stable flame, an enhanced outburn of the fuel and low NOx and CO emission levels.

In some embodiments the round burner may further comprise a core tube disposed in the center of the round burner within the primary duct for supplying supplemental core air to the combustion chamber, wherein the swirl tube may be an additional tube disposed around the core tube and sealed thereagainst at a downstream end of the additional tube. The additional tube may have elongated inclined through slots extending through a wall of the additional tube at an angle relative to the longitudinal direction of the additional tube and a plane perpendicular to the longitudinal direction, wherein the elongated through slots are positioned close to the sealed downstream end in a distance to the outlet of the burner.

In other embodiments the swirl tube may be a closed tube disposed in a center of the round burner within the primary duct and having a closed downstream end. The closed tube may have elongated inclined through slots extending through a wall of the closed tube at an angle relative to the longitudinal direction of the closed tube and a plane perpendicular to the longitudinal direction, wherein the elongated through slots are positioned close to the closed downstream end in a distance to the outlet of the burner.

In any of the before mentioned embodiments, the auxiliary gas may be provided to and flow through the additional tube and closed tube, respectively, and exit through the through slots or cut-outs into the primary duct. Because the through slots are arranged at an angle, they create a kind of twist or swirl in the discharged auxiliary gas and the fuel particles or mixed gas fuel stream will be deflected by this swirl gas to the outer areas of the gas and fuel duct. The swirl tube may be non-metallic and does not include any impellers or other means protruding into the primary duct, such that pressure loss and wear may be reduced.

According to another aspect, a method of combustion is provided. The method comprises supplying a mixed flow of fuel and gas by at least one burner through at least one fuel nozzle to a combustion chamber through a duct and deflecting the incoming mixed flow of fuel and gas in the duct using ejection means which eject an auxiliary gas into the duct to deflect the incoming mixed flow of fuel and gas in a direction from a center to outer areas of the duct so as to increase the concentration of the mixed flow of fuel and gas in outer areas of the fuel nozzle and decrease the concentration of the mixed flow of fuel and gas in the middle or center section of the fuel nozzle.

The combustion method of present invention may be performed using the combustion system of any embodiment mentioned before and may achieve the same advantageous effects. In order to avoid repetitions, reference is generally made to the above description of the embodiments of the inventive combustion system and their advantages, which equally apply to the method of present invention.

In some embodiments of the method, deflecting the incoming mixed flow of fuel and gas in the duct may be advantageously performed using an auxiliary gas nozzle, preferably a counter-flow nozzle which receives the auxiliary gas and injects the auxiliary gas in a counter-flow direction against or at least at an oblique angle against the flow direction of the mixed flow of fuel and gas.

In other embodiments of the method, deflecting the incoming mixed flow of fuel and gas in the duct may be performed using a swirl tube disposed in the duct and arranged to provide the auxiliary gas to and eject the auxiliary gas into the duct through inclined through slots in a direction so as to deflect the incoming mixed flow of fuel and gas towards the outer areas of the primary duct and to induce a swirling movement of the mixed flow of fuel and gas around a longitudinal axis of the primary duct.

Further details of advantageous embodiments of the present invention may be taken from the dependent claims, the drawings and the associated detailed description. The invention is described below in greater detail by reference to the drawing, which shows exemplary embodiments of the invention that are not limiting in any way, wherein the same reference numbers are used in all figures to designate the same elements. In the figures:

Figure 1:
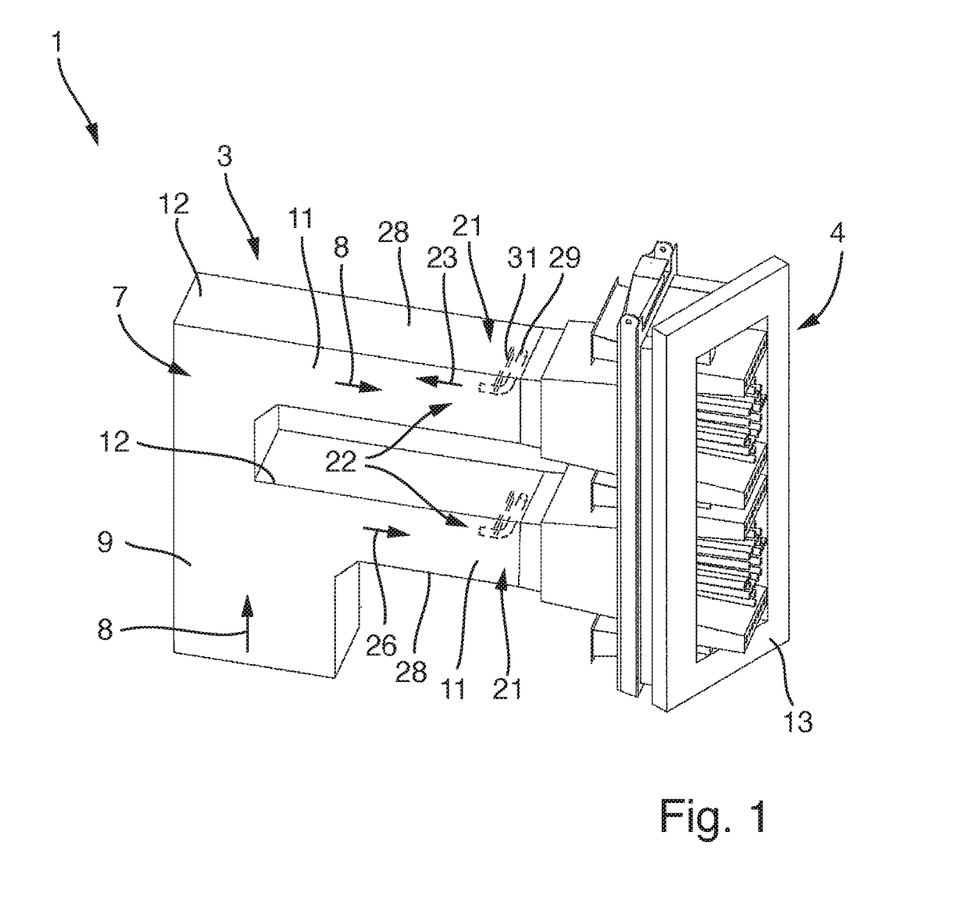
FIG. 1 is a simplified perspective view of a combustion system including a counter-flow nozzle in accordance with an exemplary embodiment of the present invention.
Figure 2:
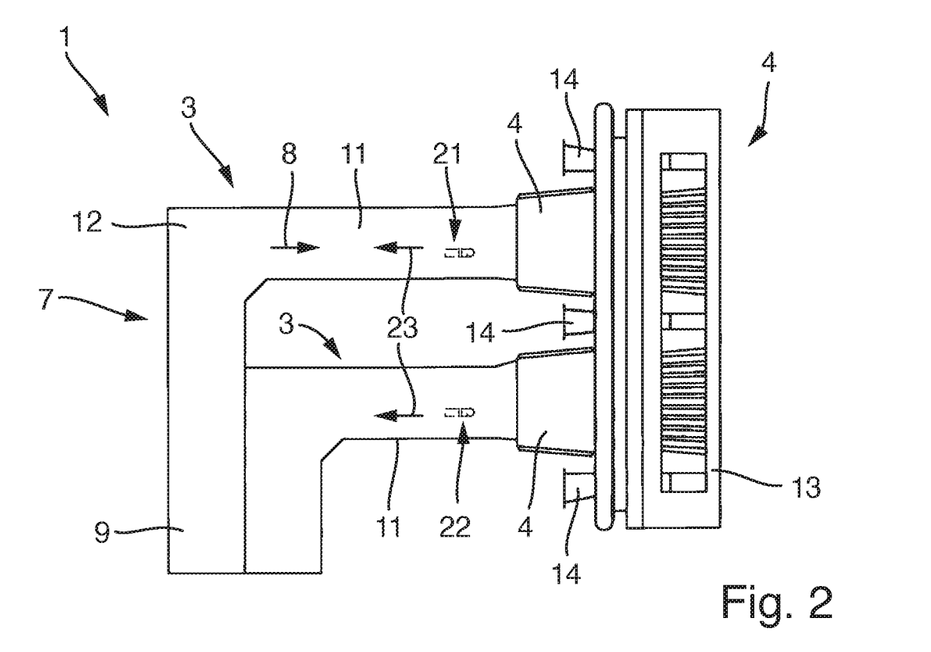
FIG. 2 is a side view of the combustion system shown in FIG. 1.
Figure 3:
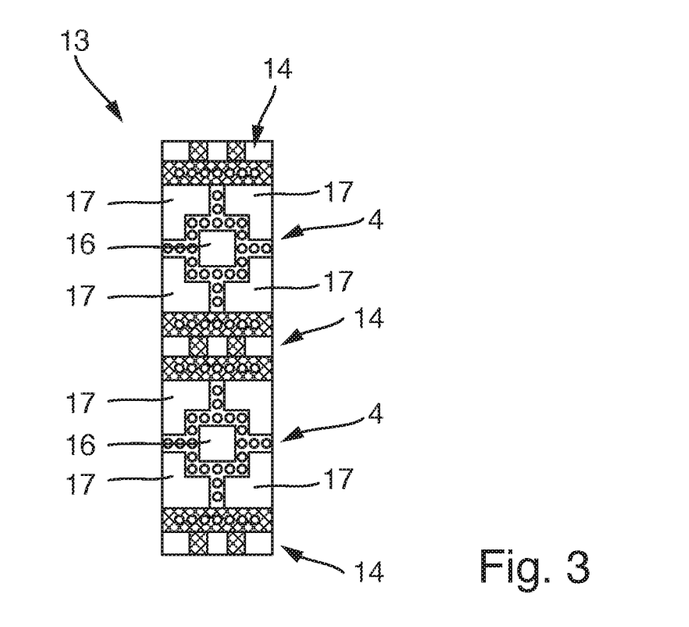
FIG. 3 is a front view of an outlet of a burner with two fuel nozzles and secondary air nozzles above and below the fuel nozzles, in accordance with an exemplary embodiment of the present invention.
Figure 4:
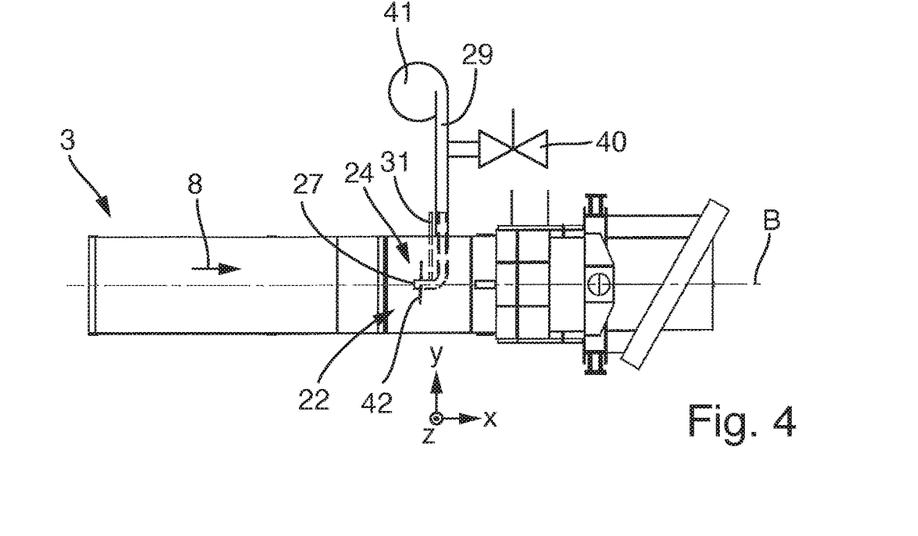
FIG. 4 is a top view of the combustion system shown in FIGS. 1 through 3.
Figure 5:
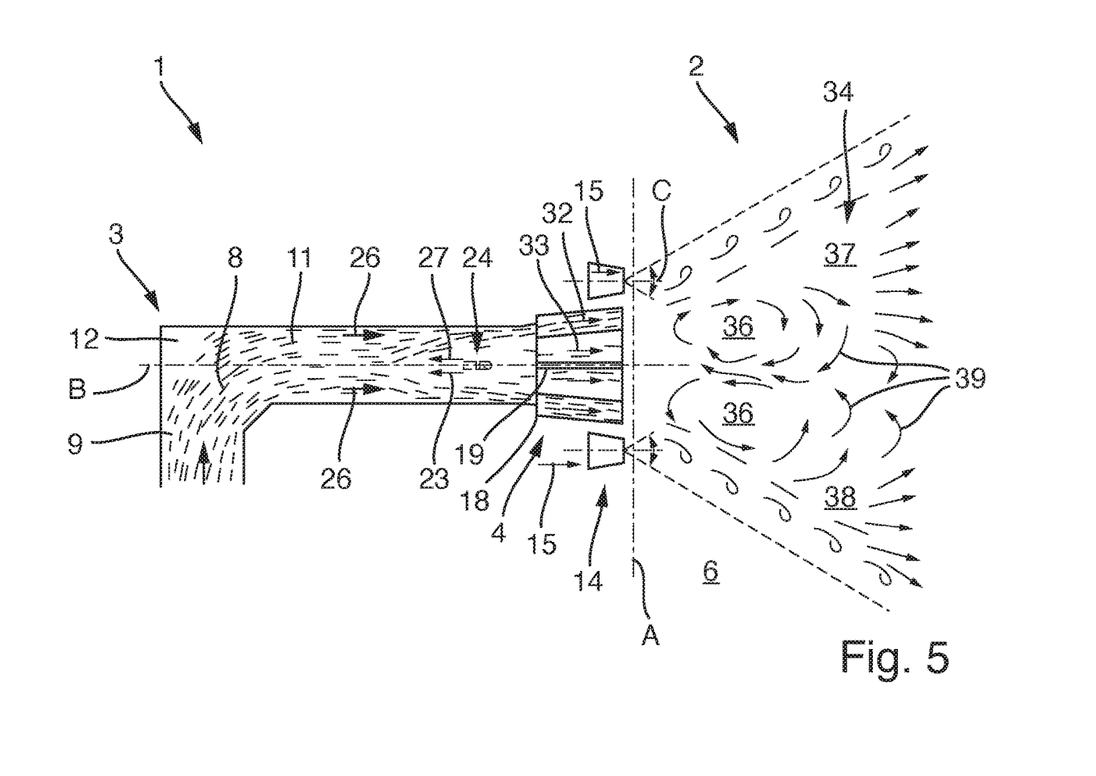
FIG. 5 is a schematic side view of one of the fuel nozzles of the combustion system shown in FIGS. 1 through 4 illustrating the flow of the mixed fuel and gas and the resulting flame in a combustion chamber to illustrate the operation of the combustion system in accordance with an embodiment of the present invention.

FIG. 1 shows a side view of a combustion system 1 for use with a boiler 2 (not shown in FIG. 1 but indicated in FIG. 5) for power generation, for example, in accordance with an exemplary embodiment of present invention. FIGS. 2, 3 and 4 show a side view, a front view and a top view of the combustion system 1 of FIG. 1 and FIG. 5 shows a partial schematic view of the combustion system 1 arranged at the boiler 2 to illustrate its operation. In the exemplary embodiment shown, the combustion system 1 includes one burner 3 including at least one, in present case two fuel nozzles 4 at the free end thereof to supply a mixed flow of fuel and gas through the at least one fuel nozzle 4 to a combustion chamber 6 (indicated in FIGS. 2 and 5) of the boiler 2. The burner 3 is connected to a source of fuel (not shown) through a ducting system 7. In preferred applications, the burner 3 may be connected to a pulverizer or mill (not shown), which is arranged to grind a solid fuel, such as coal, coke, lignite, biomass, etc, to the required finesse and to supply a mixed flow 8 of pulverized fuel and gas through the ducting system 7 to the burner 3 and further to the fuel nozzles 4. The combustion system 1 is especially suitable for use as a lignite-fired combustion system 1.

While the combustion system 1 shown in FIGS. 1 through 4 is illustrated and described as including pulverized fuel burner 3 so as to supply a mixed flow 8 of pulverized fuel and gas to and through the fuel nozzles 4 into the combustion chamber 6 for combustion, the combustion system 1 may be used with any desired fuel and may, in particular, also use a fuel gas mixture obtained from refinery gases or other combustible waste gases, for example. Any description with regard to a pulverized fuel (PF), such as pulverized coal, shall also apply to other types of fuel, in particular a fuel gas mixture from refinery gases.

In addition, while the combustion system shown in FIGS. 1 through 4 includes one burner 3 and two fuel nozzles, the combustion system may include any number of one, two, three or more burners 3 and/or fuel nozzles 4.

Referring back to the FIGS. 1 through 4, the ducting system 7 includes, in present example, a first duct portion 9 which, in the operating state and as shown in the figures, is a vertical duct portion 9 and is a common duct for the downstream portions of the burner 3, and second duct portions 11 which, in the operating state and as shown in the figures, are horizontal duct portions fluidly connected to the first, vertical duct portion 9 through a corresponding elbow 12 and also fluidly connected to the fuel nozzle 4. The combustion system 1 might also have separate first, vertical duct portions 9 for each individual burner 3. The duct portions 9 and 11 may each have a rectangular cross-section, for example.

Referring especially to FIG. 3, a front view of an outlet 13 of the burner 3 including the two fuel nozzles 4 and secondary air nozzles 14 is illustrated in a simplified view. Each fuel nozzle 4 is subdivided into a center nozzle section 16 positioned in the middle or center of each fuel nozzle 4 and peripheral nozzle sections 17 which are disposed so as to surround the center nozzle portion 16. In the exemplary embodiment shown, four peripheral nozzle sections 17 are positioned at and around each corner of the center nozzle portion 16.

The secondary air nozzles 14 are arranged above and below each fuel nozzle 4 to inject a secondary air 15 into the combustion chamber 6 of the boiler 2, for example, in order to provide stable combustion of the mixed flow 8 of fuel and gas in the combustion chamber 6. An axis C (see FIG. 5) of the secondary nozzles 14 is parallel to the axis B of the fuel nozzles 4. The fuel nozzle 4 may have peripheral fuel nozzle channels 18 in fluid communication with the peripheral nozzles sections 17 of the nozzle outlet 13 and core air tubes 19 in fluid communication with the center nozzle section 16 of the nozzle outlet 13.

Referring again to FIGS. 1, 2, and 4, it may be seen that the combustion system 1 of the exemplary embodiment includes a deflector device 21 which is positioned within each second, horizontal duct portion 11 (subsequently also simply called duct 11) of the ducting system 7 downstream of the corresponding elbow 12 and upstream of the corresponding fuel nozzle 4 to deflect the incoming mixed flow 8 of fuel and gas before it is supplied to the fuel nozzle 4. The deflector device 21 comprises ejection means 22 arranged to eject an auxiliary gas 23 into the duct 11 so as to deflect the incoming mixed flow 8 of fuel and gas in a direction from a center to the outer areas of the duct 11.

In the exemplary embodiment shown in FIGS. 1 through 5, the ejection means 22 comprise an auxiliary gas nozzle 24 configured to receive the auxiliary gas 23 and inject the auxiliary gas 23 in a direction at least at an oblique angle against the flow direction 26 of the incoming mixed flow 8 of fuel and gas. In particular, the auxiliary gas nozzle 24 may be a counter-flow nozzle which has a nozzle outlet 27 directed to the upstream direction, i.e. opposite to the flow direction 26 of the fuel and gas such that the jet of the ejected auxiliary gas 23 strikes the incoming mixed flow 8 of fuel and gas in the opposite direction. As a result, the incoming fuel and gas mixture 8 may be uniformly deflected and distributed outwards, to the sides or duct walls 28 of the duct 11 in order to increase the concentration of the mixed flow 8 of fuel and gas in the outer areas or peripheral nozzle sections 17 of the fuel nozzles 4 and decrease the concentration of the fuel and gas mixture 8 in the middle area or center section 16 of the fuel nozzle 4. This provides a desired distribution of the flow of fuel for improved ignition and combustion in the combustion chamber 6.

As may be seen in FIGS. 1 and 4, for example, a feed line 29 is provided in fluid communication with the counter-flow nozzle 24 to supply the auxiliary gas 23 to the counter-flow nozzle 24. In the example shown, the feed line 29 extends through a side wall of the burner 3, but it may be provided through any of the duct walls 28 of the duct 11. The auxiliary gas 23 provided by the feed line 29 may be any air, gas or air and gas mixture which is available and suitable to perform the deflection function of present invention. In particular, the auxiliary gas 23 may be tapped from the gas or the secondary air supply of the burner 3. It may also include at least a fraction of a recirculation gas (not shown), which is generated in the combustion chamber 6 and may be led back and mixed with additional air or gas and provided to the feed line 29. When not enough primary and/or secondary air is available in the boiler 2 to be tapped off, fresh air may be taken from the outside and supplied to the feed line 29 through an air blower or fan. Using or adding fresh air may enhance combustion of fuels especially in cases when a pulverized fuel has a low milling grade or when a pulverized fuel or fuel gas mixture has a low calorific value.

With continued reference to FIGS. 1 and 4, a shield device 31 may be arranged in the duct 11 in front of, i.e. upstream of the portion of the feed line 29 that runs within the duct 11 to shield the field line 29 from the incoming mixed flow 8 of fuel and gas to prevent erosion and wear of the feed line 29. The shield device 31 may be in the form of a semi-cylindrical shell or plate, for example, which is positioned in close proximity to the feed line 29 and may also partly encompass sides of the feed line 29. The shield device 31 is made of a wear-resistant material, e.g. steel, alloy or a wear-resistant plastic material. The shielded feed line 29 may be made from any material, including plastic materials. The shield device 31 may be omitted if not needed.

The operation of the combustion system 1 described so far shall now be described in more detail by additionally referring to FIG. 5. FIG. 5 shows a cut out section of the combustion system 1 of FIGS. 1 through 4 illustrating, for the sake of clarity, only a part of the burner 3 and a part of the ducting system 7 including the vertical duct portion 9 and the horizontal duct portion 11, the fuel nozzle 4 at the free end of the burner 3 and two secondary nozzles 14 disposed above and below the fuel nozzle 4. A vertical axis A indicates the outer boundary or wall of the combustion chamber 6 of the boiler 2, where the outlet 13 of the fuel nozzle 4 is positioned. A mixed flow 8 of fuel and gas is supplied through the ducting system 7. The fuel may be pulverized fuel, in particular pulverized coal, or a fuel gas mixture including refinery gas or waste gases, for example. The mixed flow 8 of fuel and gas is supplied through the vertical duct portion 9 and turns in the elbow 12 from a vertical upward flow direction to the horizontal flow direction 26 towards the fuel nozzle 4. When the mixed flow 8 of fuel and gas reaches the proximity of the deflector device 21, it is deflected to the sides or walls 28 of the duct 11 by the deflector device 21.

In more detail, the auxiliary gas 23 is discharged from the nozzle outlet 27 of the counter-flow nozzle 24 in a counter-flow direction substantially opposite to the flow direction 26 of the mixed flow 8 of fuel and gas in the center of the duct 11. When the ejected auxiliary gas 23 impinges on the incoming mixed flow 8 of fuel and gas, it acts to effectively deflect the mixed flow 8 outwards, i.e. upwards, downwards and to the sides of the duct 11, to cause the mixed flow 8 to flow around the deflector device 21. This is achieved by a fluid, namely the auxiliary gas 23, only and does not require any solid deflectors, kickers or impellers within the duct 11.

The velocity of the discharged auxiliary gas 23 may be selected based on the position of the counter-flow nozzle 24 in the duct 11 and relative to the outlet 13 of the fuel nozzle 4, the feed capacity of the feed line 29 and the counter-flow nozzle 24, the type and quality of the fuel used and the operating conditions such that a fuel-rich jet 32 is concentrated in outer areas of the duct 11 and reaches the outer areas or peripheral nozzle sections 17 of the fuel nozzle 4, while a decreased concentration of the mixed flow of fuel and gas, i.e. a fuel-lean jet 33 flows around the counter-flow nozzle 24 and reaches the center nozzle section 16 of the fuel nozzle 4. This provides an advantageous fuel distribution at the fuel nozzle outlet 13 at the entry into the combustion chamber 6, which greatly enhances ignition, combustion and burnout of the fuel in the combustion chamber 6 and provides a large, extended and stable flame 34 in the combustion chamber 6.

As may be seen in FIG. 5, a low pressure zone 36, which serves as an ignition stabilizing region, is created substantially downstream of the center nozzle section 16 of the fuel nozzle 4 between the diverging upper and lower fuel-gas streams which enter into the combustion chamber 6 substantially from the peripheral nozzle sections 17. Gas and fuel particles are drawn into the low pressure region 36 from the lower portions of the upper fuel-gas stream 37, which includes the fuel-rich jet 32, and the upper portions of a lower fuel-gas stream 38, which also includes the fuel-rich jet 32, and are ignited. The ignition is stabilized, because a portion of the hot combustion products formed during ignition are recirculated within this low pressure ignition stabilizing zone 36, as indicated by the circulating arrows 39 in FIG. 5, thereby providing the necessary ignition energy for igniting the fuel particles which are subsequently drawn into the region 36 from the upper and lower fuel-gas streams 37, 38. A stable ignition is further facilitated, because the fuel-gas ratio within the ignition stabilizing zone 36 is increased, which in turn reduces the amount of energy necessary to initiate ignition.

The combustion system 1 thus provides a burner 3 with an improved ignition performance, a large effective ignition area, also in low-load operation range, and with low NOx and CO emissions. Low NOx emission levels are achieved by the reducing atmosphere in the inner flame, i.e. the low pressure zone 36, resulting in effective NOx reduction by reducing volatile matter, char or other fuel particles in this region. The NOx emission levels are further reduced by the diminished high oxygen level area in the outer flame of the ignition area, i.e. the zones 37, 38 in FIG. 5. The large ignition area with widely distributed fuel particles facilitates a complete burnout of the fuel in the flame 34, thus further reducing CO emissions. The burner 3 is low maintenance, since it does not include any wear parts, like solid deflectors and the like, within the duct 11, which would otherwise be subjected to the mixed flow of fuel and gas. Erosion and wear of the hardware of the burner 3 may be greatly minimized.

The combustion system 1 may be modified in various aspects. For example, and as may be seen in FIG. 5, the secondary air nozzles 14 may be fixedly tilted or preferably arranged tiltable about an angle relative to the axis B of the fuel nozzle 4 to allow for an adjustment of the angle of injection of the secondary air 15 into the combustion chamber 6. Secondary air tilting allows further control of the flame 34 and combustion.

Further optional modifications are shown in FIG. 4. As may be seen, the combustion system 1 may include means arranged to vary the outlet velocity of the auxiliary gas 23 ejected from the ejection means 22, in particular the nozzle outlet 27 of the counter-flow nozzle 24. In one exemplary embodiment, a flow regulating valve 40 may be arranged in fluid communication with the feed line 29 and may be controlled by a control device (not shown) of the combustion system 1 to adjust the flow rate and velocity of the auxiliary gas 23 fed through the feed line 29 to the counter-flow nozzle 24.

As an alternative, a gas blower or fan 41 may be provided to draw gas from a gas supply or fresh air from the outside, for example, and to provide it to the feed line 29 as the auxiliary gas 23. The gas blower or fan 41 may be adjustable in speed, and in preferable embodiments controllable in speed during operation, in order to allow varying the outlet velocity of the auxiliary gas 23 by adjusting or controlling the speed of the gas blower or fan 41.

In another embodiment, which may be used as an alternative or in addition, the combustion system 1 may include throttle means 42 configured to change a flow cross-section of the auxiliary gas nozzle 24 to adjust the velocity of the ejected auxiliary gas 23. The auxiliary gas nozzle 24 may have a variable aperture controlled by a control device (not shown) during operation, for example, to change the size of the cross-section and thus the velocity of the injected auxiliary gas 23.

In all these embodiments, varying the velocity of the injected auxiliary gas 23 may achieve the same effect as varying the location and size of the deflector device 21 or any solid deflectors, impellers or kickers in conventional systems. The velocity of the counter-flow injected auxiliary gas 23 determines the size and position of the obstacle presented to the incoming mixed flow 8 of fuel and gas. This facilitates easy control of how effectively the fuel particles or mixed gas fuel streams are deflected from the center of the fuel-gas stream 8 to the outside. The combustion system 1 may thus be easily adapted to account for different types and qualities of fuel, including different degrees of grinding and/or drying of pulverized fuels. For example, the velocity of the ejected auxiliary gas 23 may be increased for fuels having increased fractions of larger fuel particle sizes and/or a higher degree of dryness to provide a greater momentum to effectively deflect and distribute the fuel outwards. The velocity of the ejected auxiliary gas 23 may be reduced by adjustment for fuels having a high degree of grinding with increased fractions of small fuel particle sizes and for fuel gas mixtures without a pulverized fuel, which require lower momentum for deflection.

The velocity of the ejected auxiliary gas 23 may also be adjusted in dependence of the burner operating conditions. The velocity may be increased for full load operation, when a pulverized fuel having a low gas-fuel ratio is provided by a pulverizer or mill to the burner 3, and may be reduced for part-load operation, when the gas-fuel ratio provided by the pulverizer is increased. This provides additional flexibility with regard to the auxiliary gas 23 flow adjustment and optimization of the ignition, combustion and pollutant emission levels in reaction to different burner operating conditions.

As an additional modification, in any of the embodiments of the combustion system 1 described above, the ejection means 22, in particular the auxiliary gas nozzle 24, may be arranged adjustable with regard to its orientation in space. In particular, the ejected auxiliary gas nozzle 24 may be arranged adjustable such that the nozzle outlet 27 and the ejection or discharge angle may be changed or adjusted, as needed, relative to at least two of the three orthogonal axes X, Y, and Z as indicated in FIG. 4. In particular, an adjustment of the nozzle outlet 27 in the Y-Z plane perpendicular to the axis B of the fuel nozzle 4 may be advantageous to adjust the deflection of the incoming mixed flow 8 of fuel and gas to the desired direction. Due to the elbow 12, the incoming mixed flow 8 of fuel and gas might concentrate in the upper region of the duct 11 and it may be then desired to deflect a part of the mixed flow 8 downwards, towards the bottom portions of the duct wall(s) 28. It may also be desired to deflect the mixed flow 8 of fuel gas to the sides of the duct 11 depending on some boiler conditions. Still further, a nozzle outlet 27 inclined both upwardly and to the sides of the duct 11 may additionally induce a swirl motion into the mixed flow 8 of fuel and gas. The swirling mixed flow 8 exiting the fuel nozzle outlet 27 may additionally improve distribution, ignition and combustion of the fuel in the combustion chamber 6.

Figure 6:
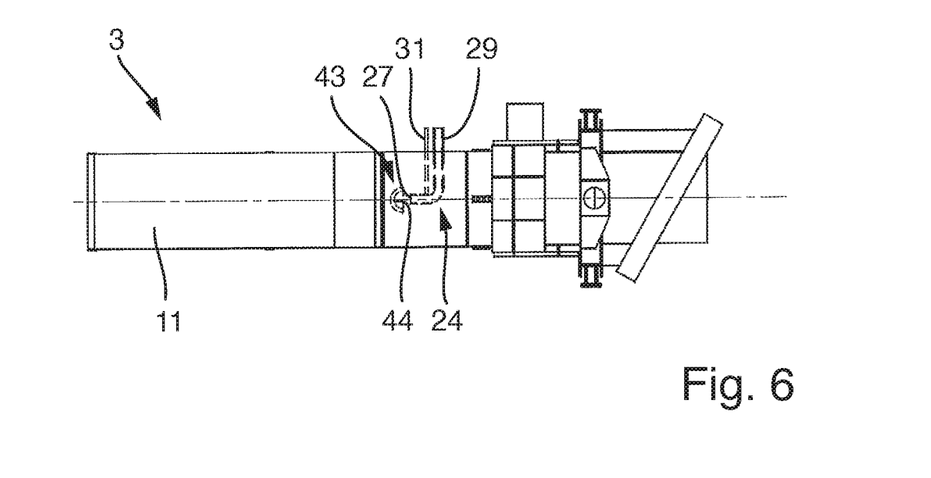
FIG. 6 is a top view of a combustion system including a modification of the deflector device of the combustion system in accordance with another exemplary embodiment of the present invention.
Figure 7:
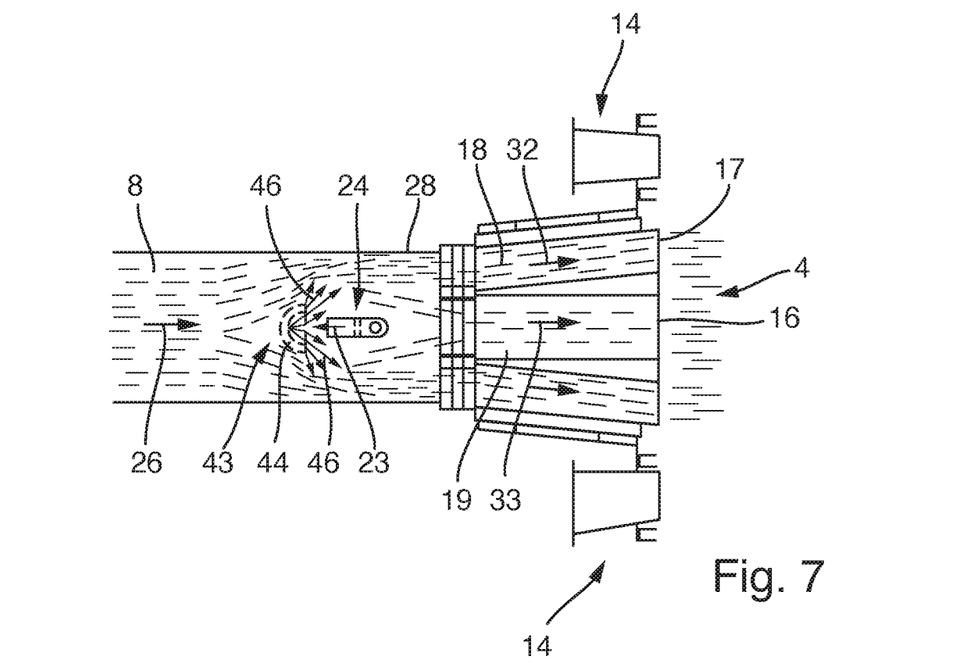
FIG. 7 is an enlarged schematic cross-sectional view of the combustion system shown in FIG. 6 illustrating the flow of the mixed fuel and gas.

Another optional embodiment of the combustion system 1 is shown in FIGS. 6 and 7, wherein FIG. 7 shows an enlarged cut out section of the burner 3 shown in FIG. 6. In this exemplary embodiment, the combustion system 1 may further comprise baffle means 43 which are arranged in front, i.e. upstream of the nozzle outlet 27 of the auxiliary gas nozzle 24. The baffle means 43 may be dish shaped or bowl shaped and include a concave surface 44 facing in the direction of the auxiliary gas nozzle outlet 27.

As may be seen from the detailed view in FIG. 7, the concave surface 24 of the baffle means 43 acts during operation to spread the ejected auxiliary gas 23 outwards, towards the duct walls 28 of the duct 11, as is indicated by the arrows 46 in FIG. 7. The spread auxiliary gas 46 then impinges on the mixed flow 8 of fuel and gas flowing around the deflector device 21 and provides for additional deflection of the mixed flow 8, which has already been deflected by the baffle means 43, so as to enhance the overall distribution effect on the mixed flow 8. The baffle means 43 may be preferably made from wear-resistant material.

Figure 8:
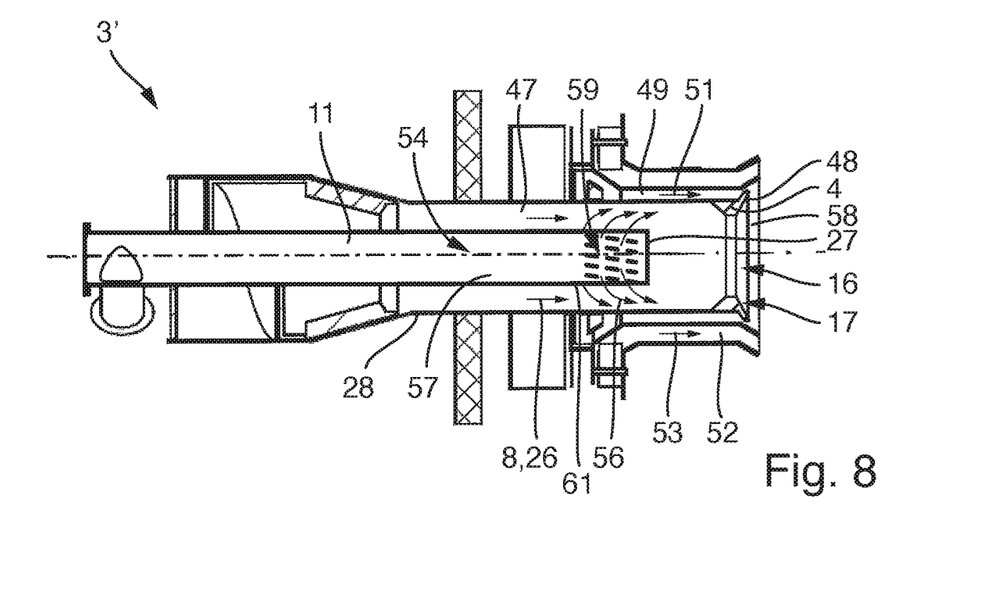
FIG. 8 is a side view of a combustion system including a round burner and a swirl tube in accordance with another exemplary embodiment of the present invention.
Figure 9:
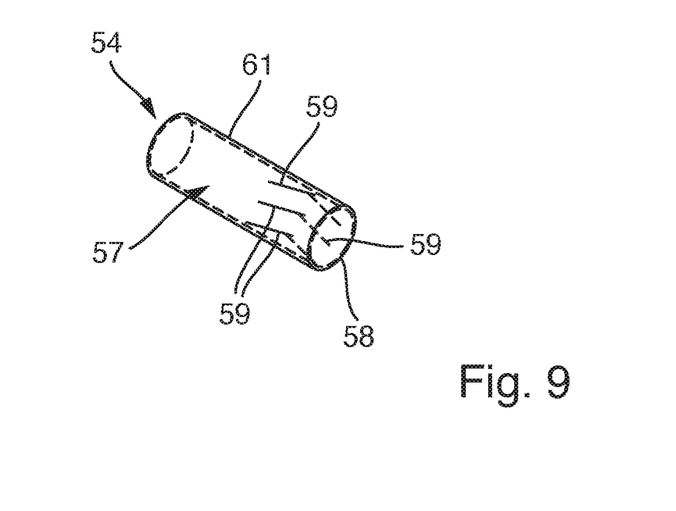
FIG. 9 is a perspective view of the swirl tube used in the round burner shown in FIG. 8, in a simplified, enlarged illustration.

Referring to FIGS. 8 and 9, another embodiment of a combustion system 1 according to present invention is shown. The combustion system 1 is especially suitable for use as a coal-fired combustion system 1, but may also use other solid or gaseous fuels, as mentioned above. In this exemplary embodiment, the combustion system 1 includes a round burner 3' which comprises a tubular primary duct 47 for supplying a mixed flow 8 of fuel and primary air to the combustion chamber 6. While the term "primary air" is commonly used in connection with coal-fired combustion systems of the type illustrated in FIGS. 8 and 9, the primary air may include any air, gas (hot or cold gas) or air and gas mixture which may be used for mixing with the fuel and combustion. The terms "primary air" and "gas", which is otherwise used herein, are interchangeable. The downstream end 48 of the primary duct 47 defines the fuel nozzle 4. The burner 3' additionally includes a tubular secondary duct 49 which is arranged to concentrically enclose the primary duct 47 for supplying secondary air 51 to the combustion chamber 6. In the example shown, the burner 3' additionally includes a tubular tertiary duct 52 arranged to concentrically surround the secondary duct 49 for supplying tertiary air 53 to the combustion chamber 6. The primary duct 47, the secondary duct 49 and the tertiary duct 52 are all arranged concentrically to each other. The tertiary duct 52 might be omitted if not needed, but is preferably provided to increase expansion of the flame and provide an improved performance of the burner 3' with regard to ignition and combustion of the fuel.

As may be seen in FIGS. 8 and 9, the deflector device 21 in the burner 3' comprises a swirl tube 54 which is arranged to provide the auxiliary gas 23 and eject the auxiliary gas 23 into the duct 11 in a direction indicated by arrows 56 in FIG. 8 so as to deflect the incoming mixed flow 8 of fuel and primary air towards the outer areas of the primary duct 47 and to induce a swirling movement of the mixed flow 8 of fuel and primary air around the longitudinal axis B of the primary duct 47 and fuel nozzle 4.

The swirl tube 54 is a closed tube 57 which is disposed in a center of the round burner 3' within the primary duct 47 and has a closed downstream end 58. The closed end 58 is disposed in a distance to the nozzle outlet 27 of the burner 3'. The closed tube 57 comprises elongated inclined through slots 59 which are distributed circumferentially around the closed tube 57 and extend through the wall 61 of the closed tube 57 from the inside to the outside of the tube 57. The through slots 59 are inclined such that they are arranged at an angle relative to the longitudinal direction along the axis B of the closed tube 57 and also relative to a plane perpendicular to the longitudinal direction. The through slots 59 are positioned close to the closed downstream end 58.

During operation, the auxiliary gas 23 is provided through the closed tube 57 and flows towards the closed end 58 thereof. The auxiliary gas 23 may be provided from any suitable air and/or gas source, such as from the primary, secondary or tertiary air supply or from an external air/gas source. The auxiliary gas 23 exits from the inside of the closed tube 57 through the through slots 59 and is deflected thereby such that it has both a radial and an axial movement component and also a swirl component around the primary duct 47 after passing the through slots 59. This swirl air 56 then impinges on the incoming flow 8 of fuel and air causing deflection of the mixed flow 8 to the outer areas of the primary duct 47, i.e. towards the duct wall 28 and also inducing a swirl motion into the mixed flow 8. The mixed flow 8 of fuel and primary air thus receives a rotation impulse and is caused to move away from the closed tube 57 and closer to the outer wall 28 of the primary duct 47. This results in a swirling fuel-air mixture 8 entering the combustion chamber 6, which has fuel richer concentrations in the outer areas 17 and fuel richer concentrations in the center section 16 of the nozzle outlet 27 of the burner 3'. Thus, substantially the same effects are achieved as with the auxiliary gas nozzle 24 in the embodiment of FIGS. 1-7, including improved ignition and combustion performance, enlarged combustion zone, stabilized flame, enhanced outburn of the fuel and low NOx and CO emission levels. In order to avoid repetitions, reference is made to the description of the effects and advantages described in connection with the embodiments of FIGS. 1-7, which also correspondingly apply to the combustion system 1 of FIGS. 8 and 9.

Figure 10:
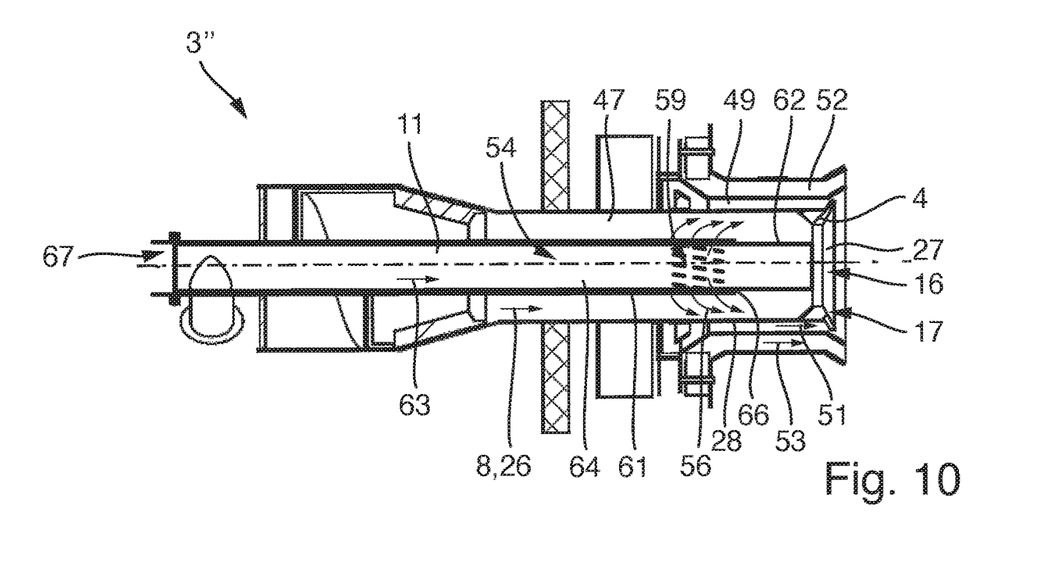
FIG. 10 is a side view of another kind of a round burner including a combustion system and a swirl tube in accordance with another exemplary embodiment of the present invention.
Figure 11:
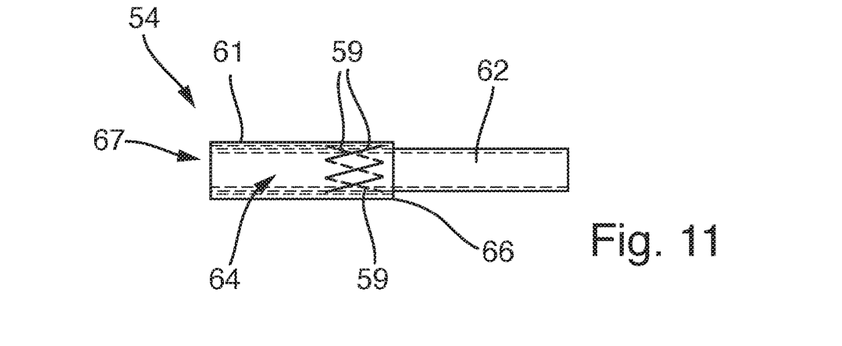
FIG. 11 is an partial side view of a combination of a core air tube and the swirl tube used in the round burner shown in FIG. 10, in a simplified, enlarged illustration.

Referring to FIGS. 10 and 11 another embodiment of a combustion system 1 having a round burner 3" according to present invention is shown. This embodiment substantially correspond to the embodiment shown in FIGS. 8 and 9 such that the same reference signs indicate the same parts used in both embodiments and the description of the embodiment of FIGS. 8 and 9 also correspondingly applies to the embodiment of FIGS. 10 and 11 unless described otherwise below.

In the exemplary embodiment of FIGS. 10 and 11, the round burner 3" also includes the primary, secondary, and optional tertiary ducts 47, 49, 52, which are arranged concentrically to each other. In addition, the boiler 3" further includes a core air tube 62 disposed in the center of the round burner 3" within the primary duct 47 for supplying supplemental core air 63 to the combustion chamber 6. The swirl tube 54 is, in the example shown, an additional tube 64 which is disposed around the core air tube 62 and is sealed thereagainst at a downstream end 66 of the tube 64. The tube 64 includes elongated inclined through slots 59 which are distributed circumferentially around the tube 64 near the sealed downstream end 66 and extend through the wall 61 of the additional tube 64 at an oblique angle relative to the longitudinal direction of the additional tube 64, corresponding to the axis B, and a plane perpendicular to the longitudinal direction. The elongated through slots 59 are identical with or substantially similar to the through slots 59 of the burner 3' of the embodiment shown in FIGS. 8 and 9 and provide the same effects. FIG. 11 shows an enlarged cut out section of the additional tube 64 and the core air tube 62 illustrating the elongated inclined through slots 59.

During operation, auxiliary gas 23 is provided from a suitable source through the annular space 67 defined between the additional tube 64 and the core air tube 62. The auxiliary gas 23 flows through the annular space 67 to the sealed downstream end 66 and exits through the through slots 59 into the primary duct 47 thereby being deflected both to the radial and axial direction and also receiving a twist or swirl around the additional tube 64. Upon impinging on the incoming mixed flow 8 of fuel and primary air or gas flowing through the primary duct 47, the swirling auxiliary gas 56 causes deflection of the fuel-air stream 8 to the outer areas of the primary duct 47 and also induces a swirl motion into the mixed flow 8. The mixed flow 8 of fuel and primary air or gas thus receives a rotation impulse and is caused to move away from the closed tube 57 and closer to the outer wall 28 of the primary duct 47. This results in a swirling fuel-air/gas mixture 8 entering the combustion chamber 6, which has fuel richer concentrations in the outer areas 17 and fuel richer concentrations in the center section 16 of the nozzle outlet 27 of the burner 3". The result is an improved distribution of the fuel-air/gas flow entering the combustion chamber 6, which provides the basis for a safe ignition and combustion of the fuel, adequate stabilization of the flame 34 and highly efficient performance with reduced NOx and CO emissions over the entire operating range, for full and part-load operations.

Figure 12:
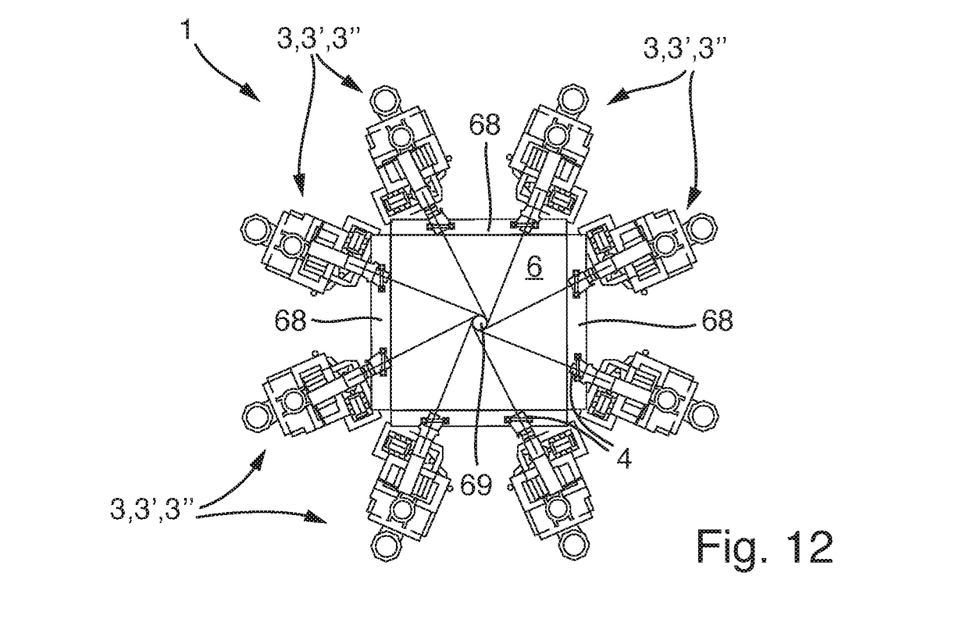
FIG. 12 is a top view of a boiler having a tangential arrangement of burners in accordance with an exemplary embodiment of the present invention.

FIG. 12 shows a top view of a boiler 2 having a tangential arrangement of burners 3 (or 3' or 3") in accordance with an exemplary application of the present invention. The mixed flow 8 of fuel and air is injected from the burners 3 (3', 3") located at the boiler walls 68 around the combustion chamber 6 in a tangential direction relative to an imaginary circle 69 so as to create a vertical vortex in the center of the combustion chamber 6. Such an arrangement may be advantageously used in lignite-fired boilers, for example, and the burners 3, 3' and 3" of present invention are especially suitable for this application. The burners 3 (3', 3") can be also arranged in the corner of the combustion chamber 6. The advantages achieved by the burners 3, 3' and 3" result in corresponding advantages and improvements of the entire performance and efficiency of lignite-fired boilers.

Figure 13:
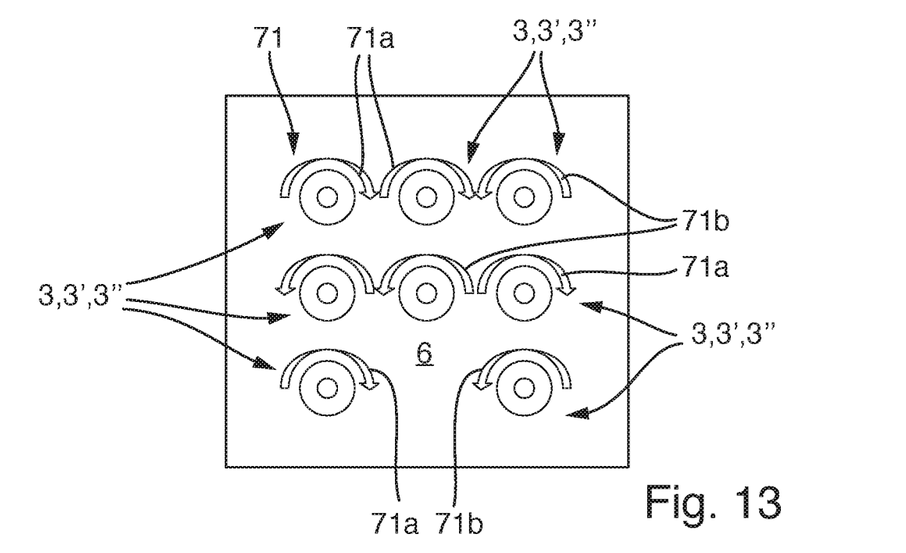
FIG. 13 is a front view of a boiler having a front fire arrangement of burners with an indication of fuel swirling directions in accordance with an exemplary embodiment of the present invention.

FIG. 13 shows a front view of a boiler 2 having a front fire arrangement of burners in accordance with an exemplary embodiment of the present invention. Any of the burners 3, 3' and 3" described above may be advantageously used for the boiler 2 shown in FIG. 13. FIG. 13 also indicates the fuel swirling directions of the mixed flow 8 of fuel and primary air exiting the fuel nozzles 4 of the burners 3 (3', 3") and entering into the combustion chamber 6 by means of the circular arrows 71. In the example shown, the deflector devices 21, e.g. the auxiliary gas nozzles 24 or the swirl tubes 54, may be arranged to induce a swirl motion indicated by the arrows 71 so as to improve intermixing of the fuel and air entering the combustion zone of the combustion chamber 6. In particular, adjacent burners 3 (3', 3") may be selectively arranged to induce a swirl in the same 71*a* or in opposite directions 71*b*, which not only enhances intermixing of air and fuel but also avoids creation of hot spots in particular zones of the combustion chamber 6.

The burners 3 (3', 3") may be arranged to achieve any desired swirling pattern of the fuel-air flows provided to the combustion chamber 6 to improve performance depending on the operating conditions. Advantageously, this may be achieved using the auxiliary gas 23 injected from the auxiliary gas nozzles 24 or the swirl tubes 54 only, without requiring any complex hardware structures for swirling the fuel-air streams within the burners. In addition, the velocity of the ejected auxiliary gas 23 may be varied to adequately react to varying fuel types or changing operating conditions.

A combustion system and method, in particular for power generation boilers, are provided. The combustion system 1 comprises a burner 3, 3', 3" for supplying a mixed flow 8 of fuel and primary air or gas through at least one fuel nozzle 4 to a combustion chamber 6, a duct 11, 47 in fluid communication with the at least one fuel nozzle 4 for guiding the mixed flow 8 of fuel and primary air or gas to the at least one fuel nozzle 4, and a deflector device 21 positioned within the duct 11, 47 upstream of the at least one fuel nozzle 4 to deflect the incoming mixed flow 8 of fuel and primary air or gas. The deflector device 21 comprises ejection means 22 arranged to eject an auxiliary gas 23 into the duct 11, 47 to deflect the incoming mixed flow 8 of fuel and primary air or gas in a direction from a center to outer areas of the duct 11, 47 to increase the concentration of the mixed flow 8 of fuel and primary air or gas in outer areas 17 of the fuel nozzle 4 and decrease the concentration of the mixed flow 8 of fuel and primary air or gas in the center section 16 of the fuel nozzle 4.

The invention claimed is:

1. A combustion system, in particular for a boiler, comprising:
   at least one burner for supplying a mixed flow of fuel and gas through at least one fuel nozzle to a combustion chamber;
   a duct in fluid communication with the at least one fuel nozzle for guiding the mixed flow of fuel and gas to the at least one fuel nozzle; and
   a deflector device positioned within the duct upstream of the at least one fuel nozzle to deflect the incoming mixed flow of fuel and gas;
   wherein the deflector device comprises ejection means arranged to eject an auxiliary gas into the duct to deflect the incoming mixed flow of fuel and gas in a direction from a center to outer areas of the duct.

2. The combustion system according to claim 1, wherein the ejection means are positioned relative to the fuel nozzle and configured to deflect the incoming mixed flow of fuel and gas to increase the concentration of the mixed flow of fuel and gas in outer areas of the fuel nozzle and decrease the concentration of the mixed flow of fuel and gas in the center section of the fuel nozzle.

3. The combustion system according to claim 1, wherein the fuel is pulverized fuel, in particular pulverized coal, or a fuel gas mixture obtained from refinery gases.

4. The combustion system according to claim 1, wherein the ejection means comprises an auxiliary gas nozzle configured to receive the auxiliary gas and inject the auxiliary gas in a direction against or at least at an oblique angle against the flow direction of the mixed flow of fuel and gas.

5. The combustion system according to claim 4, wherein the auxiliary gas nozzle is a counter-flow nozzle which has a nozzle outlet directed opposite to the flow direction of the mixed flow of fuel and gas.

6. The combustion system according to claim 4, wherein the auxiliary gas nozzle is installed in a horizontal duct portion of the duct, which is directly connected to the fuel nozzle, on the centerline of the duct portion.

7. The combustion system according to claim 4, further comprising means arranged to vary the outlet velocity of the auxiliary gas ejected from the nozzle outlet of the auxiliary gas nozzle.

8. The combustion system according to claim 7, wherein the auxiliary gas nozzle includes throttle means configured to change a flow cross-section of the auxiliary gas nozzle to adjust velocity of the ejected auxiliary gas.

9. The combustion system according to claim 4, wherein the at least one auxiliary gas nozzle is adjustable with regard to its orientation in space to change the angle of ejection of the auxiliary gas.

10. The combustion system according to claim 4, further comprising a shield device disposed in the duct upstream of and in close proximity to a feed line suppling the auxiliary gas to the auxiliary gas nozzle for shielding the feed line from the incoming mixed flow of fuel and gas.

11. The combustion system according to claim 4, further comprising baffle means arranged in front of the nozzle outlet of the auxiliary gas nozzle and having a concave surface facing in the direction of the auxiliary gas nozzle outlet for spreading the ejected auxiliary gas to the sides of the duct.

12. The combustion system according to claim 1, wherein the burner is a round burner comprising a tubular primary duct for supplying a mixed flow of fuel and gas to the combustion chamber and at least a tubular secondary duct arranged concentrically to and around the primary duct for supplying secondary air to the combustion chamber and optionally a tertiary duct arranged concentrically to and around the secondary duct for supplying tertiary air to the combustion chamber, wherein the deflector device comprises a swirl tube arranged to provide the auxiliary gas and eject the auxiliary gas into the primary duct in a direction so as to deflect the incoming mixed flow of fuel and gads towards the outer areas of the primary duct and to induce a swirling movement of the mixed flow of fuel and gas around a longitudinal axis of the primary duct.

13. The combustion system according to claim 12, wherein the burner further comprises a core tube disposed in the center of the round burner within the primary duct for supplying supplemental core air to the combustion chamber, wherein the swirl tube is an additional tube disposed around the core tube and sealed thereagainst at a downstream end of the additional tube, wherein the additional tube has elongated through slots extending through a wall of the additional tube at an angle relative to the longitudinal direction of the additional tube and a plane perpendicular to the longitudinal direction, the elongated through slots positioned close to the sealed downstream end in a distance to the outlet of the burner.

14. The combustion system according to claim 12, wherein the swirl tube is a closed tube disposed in a center of the round burner within the primary duct and having a closed downstream end, wherein the closed tube has elongated through slots extending through a wall of the closed tube at an angle relative to the longitudinal direction of the closed tube and a plane perpendicular to the longitudinal direction, the elongated through slots positioned close to the closed downstream end in a distance to the outlet of the burner.

15. A method of combustion comprising:
supplying a mixed flow of fuel and gas by at least one burner through at least one fuel nozzle to a combustion chamber through a duct; and
deflecting the incoming mixed flow of fuel and gas in the duct using ejection means which eject an auxiliary gas into the duct to deflect the incoming mixed flow of fuel and gas in a direction from a center to outer areas of the duct so as to increase the concentration of the mixed flow of fuel and gas in outer areas of the fuel nozzle and decrease the concentration of the mixed flow of fuel and gas in the center section of the fuel nozzle.

16. The method of claim 15, wherein deflecting the incoming mixed flow of fuel and gas in the duct is performed using an auxiliary gas nozzle which receives the auxiliary gas and injects the auxiliary gas in a counter-flow direction against or at least at an oblique angle against the flow direction of the mixed flow of fuel and gas in the duct.

17. The method of claim 15, wherein deflecting the incoming mixed flow of fuel and gas in the duct, is performed using a swirl tube disposed in the duct and arranged to provide the auxiliary gas and eject the auxiliary gas into the duct through inclined through slots in a direction so as to deflect the incoming mixed flow of fuel and gas towards the outer areas of the primary duct and to induce a swirling movement to the mixed flow of fuel and gas around a longitudinal axis of the primary duct.

* * * * *